United States Patent
De Bossoreille et al.

(10) Patent No.: US 9,538,670 B2
(45) Date of Patent: Jan. 3, 2017

(54) ERGONOMIC FRAME FOR A TOUCH-SENSITIVE CONTROL INTERFACE AND A CORRESPONDING CONTROL INTERFACE

(71) Applicant: ECE, Paris (FR)

(72) Inventors: Romain De Bossoreille, Paris (FR); Michaël Nahmiyace, Nogent S/Marne (FR)

(73) Assignee: ECE, Paris (FR)

( * ) Notice: Subject to any disclaimer, the term of this patent is extended or adjusted under 35 U.S.C. 154(b) by 108 days.

(21) Appl. No.: 13/937,666

(22) Filed: Jul. 9, 2013

(65) Prior Publication Data

US 2014/0020924 A1 Jan. 23, 2014

(30) Foreign Application Priority Data

Jul. 9, 2012 (FR) .................... 12 56574

(51) Int. Cl.
| | |
|---|---|
| *H05K 5/00* | (2006.01) |
| *G06F 1/16* | (2006.01) |
| *H04M 1/02* | (2006.01) |
| *H05K 7/00* | (2006.01) |
| *H01R 13/46* | (2006.01) |

(52) U.S. Cl.
CPC .......... *H05K 5/0017* (2013.01); *G06F 1/1624* (2013.01); *G06F 1/1626* (2013.01); *G06F 1/1628* (2013.01); *G06F 1/1633* (2013.01); *G06F 1/1637* (2013.01); *G06F 1/1656* (2013.01); *H04M 1/0279* (2013.01)

(58) Field of Classification Search
CPC .... G06F 1/1624; G06F 1/1628; G06F 1/1633; G06F 1/1637; G06F 1/1654; G02F 1/133308; G02F 2001/133311; G02F 2001/133314; G02F 2001/13332; G02F 2001/133322

USPC ........... 361/679.01, 679.02, 679.03, 679.04, 361/679.05, 679.06, 679.07, 679.21, 361/679.22, 679.26, 679.29, 679.3, 361/679.55, 679.56, 679.57, 679.58, 361/679.59; 174/50, 520
See application file for complete search history.

(56) References Cited

U.S. PATENT DOCUMENTS

| | | | | |
|---|---|---|---|---|
| 5,404,267 A | * | 4/1995 | Silva | G06F 1/1626 16/430 |
| 5,956,048 A | * | 9/1999 | Gaston | G06F 1/1626 345/530 |
| 6,266,685 B1 | * | 7/2001 | Danielson | G06F 1/1626 361/679.4 |
| 6,532,152 B1 | * | 3/2003 | White | G02F 1/133308 312/223.1 |
| 2004/0066422 A1 | | 4/2004 | Chandane | |
| 2007/0081303 A1 | | 4/2007 | Lam et al. | |
| 2008/0164982 A1 | | 7/2008 | Andrews et al. | |

FOREIGN PATENT DOCUMENTS

DE 3123596 1/1983

OTHER PUBLICATIONS

Search Report for French Patent Application No. FR1256574 issued Feb. 18, 2013.

* cited by examiner

*Primary Examiner* — Binh Tran
(74) *Attorney, Agent, or Firm* — Meyertons, Hood, Kivlin, Kowert & Goetzel, P.C.; Eric B. Meyertons

(57) ABSTRACT

This frame for a touch-sensitive control interface comprises a peripheral border designed to surround all or some of the touch-sensitive interface and a central zone by which the interface can be activated by touch. It comprises at least one hollow zone delimiting a surface for receiving a finger of a user.

13 Claims, 3 Drawing Sheets

FIG.4
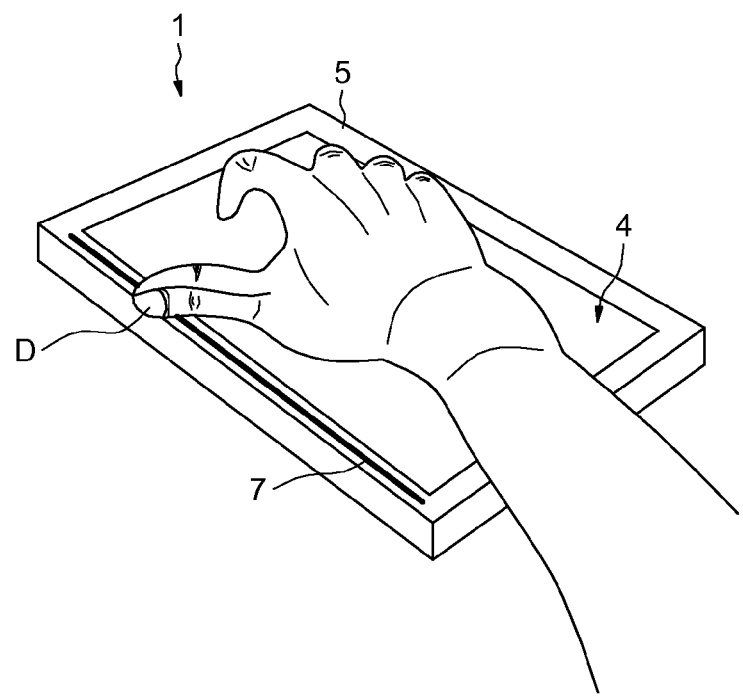
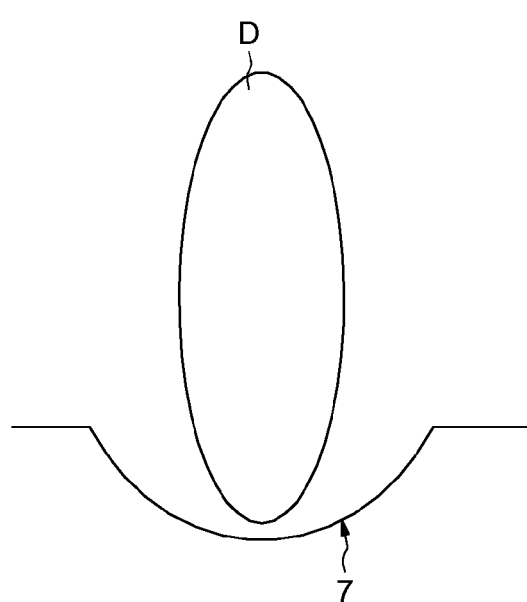
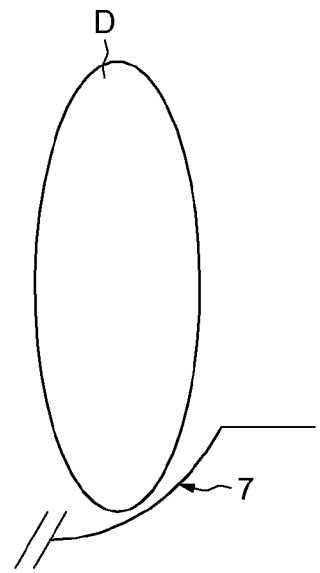
FIG.5 　　　　　FIG.6

ERGONOMIC FRAME FOR A TOUCH-SENSITIVE CONTROL INTERFACE AND A CORRESPONDING CONTROL INTERFACE

PRIORITY CLAIM

This application claims the benefit of French Patent Application No. 1256574 filed on Jul. 9, 2012.

BACKGROUND OF THE INVENTION

1. Field of the Invention

The invention relates, in a general manner, to touch-sensitive control interfaces, and relates more particularly to helping the operating of such control interfaces. One particularly worthwhile application of the invention relates to the use of touch-sensitive control interfaces in the aviation field. However, the invention also applies to any other field in which touch-sensitive interfaces are used in an environment subject to vibrations or, in a general manner, to disruptions that are likely to hamper the user and increase the risks of operating errors.

2. Description of the Relevant Art

When actuating a control button, the hand of the user may be subjected to shakings or to errors of appreciating the position of the zone to be actuated. This problem is posed more acutely when the arm of the operator is stretched out so that, in all cases, it is necessary for the user to hold his gaze on the zone to be operated while his attention must remain concentrated on another task.

These problems or ergonomics are also posed in an acute manner when it involves carrying out relatively long tasks in an environment subject to vibrations or to disruptions, such that, with fatigue in addition, the operator in the long run experiences difficulties in perfectly positioning his fingers on a zone of the interface to be operated.

Furthermore, although the mechanical interfaces, of the control button type, make it easy to identify the position of a member to be operated, notably by allowing the user to rest his finger on a member that can be identified by touch, the development of the touch-sensitive interfaces does not make it possible to identify by touch a control zone to be operated.

Moreover, when they are no longer perfectly clean, the touch-sensitive interfaces are likely to become slippery.

In view of the foregoing, it has been found that the touch-sensitive interfaces, although advantageous in several respects, are not very convenient to use in environments subject to vibrations or to turbulence of unforeseeable amplitudes. This is in particular the case on board aircraft in which, notably, the vibrations or air pockets prevent the pilot from accurately positioning his finger on a zone to be operated.

It has furthermore been found that the use of such interfaces requires, on the part of the user, in particular the pilot, holding his gaze on the interface while his attention should be maintained on another task, for example during landing, while the risks of error should be avoided.

SUMMARY OF THE INVENTION

In view of the foregoing, the object of the invention is to alleviate the aforementioned drawbacks and to improve the ergonomics of the touch-sensitive control interfaces.

According to a first embodiment, a frame for a touch-sensitive control interface comprising a peripheral border designed to surround all or some of the touch-sensitive interface and an open central zone by which the interface can be activated by touch.

The frame comprises at least one hollow zone delimiting a surface for receiving a finger of a user.

This hollow zone therefore constitutes a surface on which the user can anchor one of his fingers to constitute a reference point for the other fingers making it possible to improve dexterity.

Thus, by virtue of the anchoring of the hand by one of the fingers, the user is perfectly capable of spatially locating his other fingers, and the operation of the touch-sensitive control interface is less sensitive to the vibrations or other disruptions.

It will be noted that, in certain cases of use, this touch-sensitive interface may rest on or frame a display screen.

According to another feature, the hollow zone constitutes a concave gutter which extends along at least one of the longitudinal edges of the frame.

This hollow zone may also constitute a gutter which extends along at least one of the lateral edges of the frame.

For example, the gutter has a configuration that varies along the said edges.

This may for example involve a gutter having a section that varies from one end to the other of the gutter or in specific zones of the gutter.

The bottom of the hollow zone may furthermore be furnished with reliefs for indexing the position of the finger of the user.

It will be noted that the gutter may also be furnished with a luminous edging.

In one embodiment, the gutter forms a general angle of 45° relative to a plane of the frame.

According to yet another feature, the gutter may be bordered, on the side of the open central zone, by a raised zone.

It will also be noted that the hollow zone may be made of a material that differs from that of the rest of the frame and can be identified by touch.

In another embodiment a control interface with a touch-sensitive screen comprises a frame on which is mounted at least one touch-sensitive screen and which comprises at least one hollow zone delimiting a surface for receiving a finger of a user.

Such an interface is particularly suitable for constituting a control interface of an item of control equipment on board an aircraft.

BRIEF DESCRIPTION OF THE DRAWINGS

Other objects, features and advantages of the invention will become apparent on reading the following description given only as a non-limiting example and made with reference to the appended drawings in which:

FIG. 4 shows the interface during use; and

FIGS. 5-8 show various embodiments of the gutter.

Figure 1:
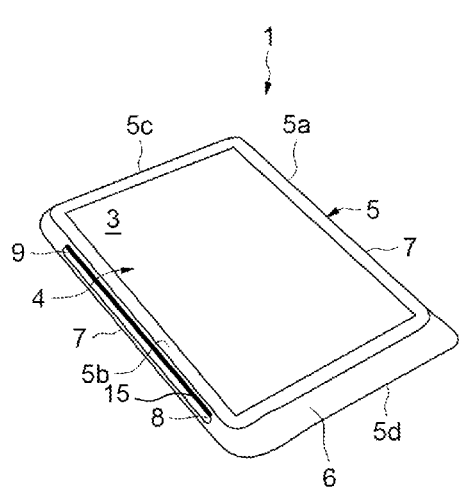
FIG. 1 is a view in perspective of a touch-sensitive control interface.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
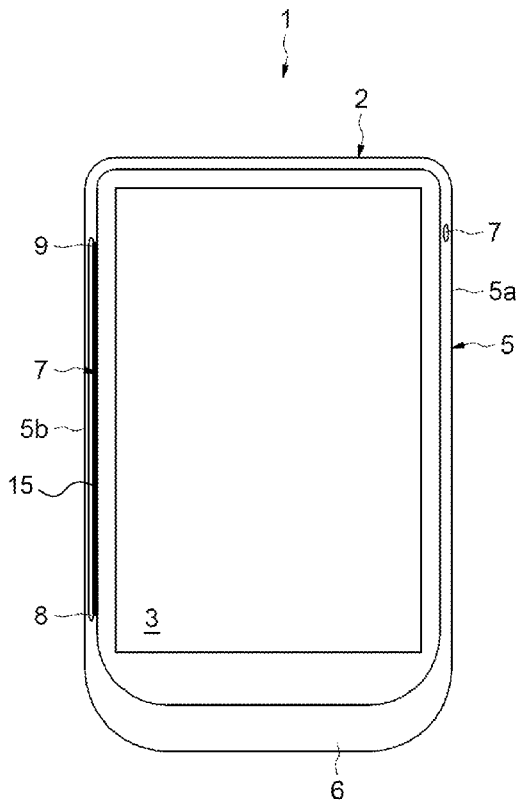
FIG. 2 is a front view of the interface of FIG. 1.

FIGS. 1 and 2 show a touch-sensitive control interface, indicated by the general reference number 1.

In a particularly worthwhile application, this control interface is designed to be incorporated into a control panel of an aircraft cockpit in order to control a set of instruments or devices on board the aircraft.

As can be seen, this interface comprises essentially a frame 2 in which is mounted a screen 3 that has been made touch-sensitive. "Touch-sensitive screen" means, in the context of the present description, a touch-sensitive surface which may or may not be used for displaying information.

The frame 2 comprises more particularly an open central zone 4 by which the touch-sensitive screen 3 can be accessed in order to be operated and a peripheral border 5 surrounding the open central zone 4.

In the exemplary embodiment shown, the peripheral border 5 has a generally rectangular shape and delimits a single open central zone.

It will however be noted that there is no departure from the context of the invention when the peripheral border adopts any other shape or configuration in order, for example, to delimit several open central zones designed to delimit one or more touch-sensitive interfaces.

As can be seen in FIGS. 1 and 2, the peripheral border 5 comprises in this instance two longitudinal edges 5a and 5b opposite one another and two transverse edges 5c and 5d.

At least one of the transverse edges and, preferably, the transverse edge 5d designed to be turned towards the user, is provided with a domed portion 6 or, in general, a raised portion designed to constitute a resting surface for the wrist of the user. Such a domed zone is however optional.

The longitudinal edges are furthermore each furnished with a hollow zone 7 made in the form of a longitudinal gutter extending along the edges 5a and 5b along a substantial portion of the touch-sensitive screen 3.

This hollow zone 7 is made in the form of a concave gutter made along the edges of the frame in order to constitute a surface for receiving one of the fingers of the user, for example the thumb.

Figure 3:
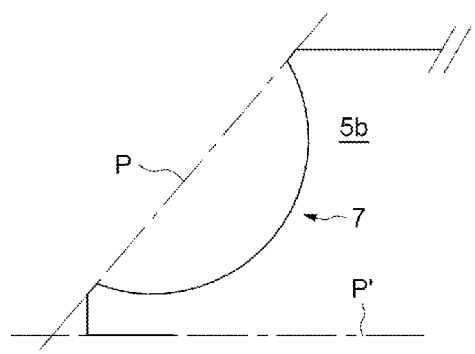
FIG. 3 is a schematic view in section of an exemplary embodiment of the gutter of the frame of FIGS. 1 and 2.

As can be seen in FIG. 3, the gutter 7 has a concave shape, for example in the shape of a truncated cylinder, of which the general plane of truncation P forms an angle of approximately 45° relative to the general plane P' of the interface. In other words, the gutter is, in this example, turned in a direction forming an angle of 45° relative to the plane P'.

Thus, the gutter 7 constitutes a point of reference for the hand of the user and, by virtue of its orientation, it also makes it possible to effectively anchor the finger in order to obtain a better sensation by making it possible to easily clamp the interface by pressing the finger against the tablet.

Moreover, such an orientation makes it possible to substantially approach the tablet laterally and therefore allows the user to reach it easily when blind.

Furthermore, such a gutter, which extends along the longitudinal edges of the frame 2, constitutes a slide for the finger of the user, along which the finger can slide to reach any zone of the interface (FIG. 4).

Naturally, the ends 8 and 9 opposite one another of the slide constitute abutments making it possible to provide touch-sensitive information relating to the positioning of the ends of the touch-sensitive screen.

Naturally, it is also possible to provide, in the gutters, additional reference points corresponding to particular zones of the touch-sensitive screen.

However, in general, such touch-sensitive information, which corresponds advantageously to zones of control of the interface, may be obtained by using gutters of variable configurations.

This may, for example, involve providing zones of variable section, hollow zones, raised zones, lugs, etchings, notches, etc.

However, preferably, in all cases, the hollow zone of the gutter will be conformed to one of the fingers of the user, for example to the thumb and will adopt a radius of curvature chosen as a function of one of the fingers that it is designed to receive.

Naturally, when the frame is furnished with a central zone of several openings, such gutters may also be provided along a central longitudinal or transverse rail, and in consequence the section of the gutter will be adapted to make it correspond to the size of another finger.

In the exemplary embodiment shown, the gutter is provided on the two longitudinal edges of the frame.

Such a gutter could be provided on only one of the longitudinal edges.

It could also be provided on one or on both the transverse edges.

It will be noted furthermore, that, in the exemplary embodiment shown, the hollow gutter has a concave shape and is made in the form of a truncated cylinder.

It would also be possible, as a variant, to produce the gutter by having its depth vary or by adopting any other shape in cross section, for example square, triangular, etc.

In one embodiment, the gutter may also be furnished with a luminous edging 15 extending for example along the whole gutter or made in the form of luminous points placed side-by-side in order, for example, to provide information relating notably to the functioning of the interface, or to indicate the positioning of the gutter in case of loss of visibility.

It will be noted finally that the invention is not limited to the embodiment described.

Specifically, it will be possible to make provision to furnish the bottom of the gutter with any appropriate relief in order to index the position of the finger of the user.

It will also be possible to make provision to produce the gutter in a material that differs from that of the rest of the frame in order to allow the user to identify the gutter by virtue of its thermometric conductivity. It would be possible for example to produce it in the form of a metal insert incorporated into a frame made of plastic.

It will be noted finally, with reference to FIGS. 5 to 8, that the gutter may adopt various configurations.

As indicated above with reference to FIG. 3, the gutter may adopt a concave shape. The orientation of the gutter may in this respect vary depending on the use. It may be laid out flat (FIG. 5) or be oriented at an angle chosen so as to make it easier to anchor the finger D (FIG. 6). The radius of curvature of this gutter may be variable.

Figure 7:
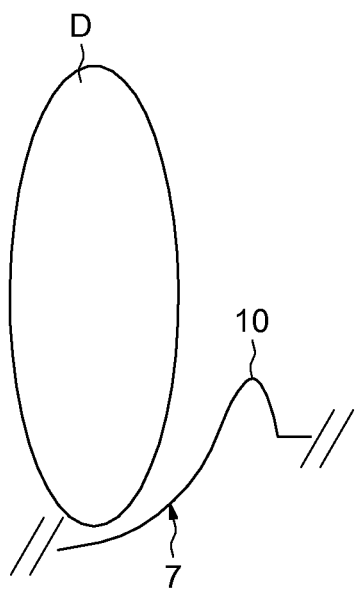
Figure 8:
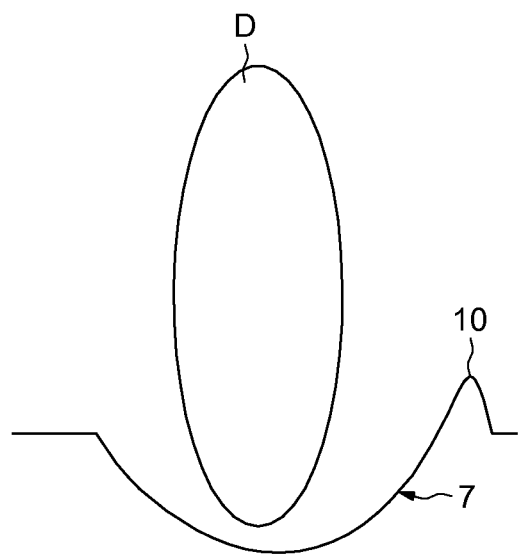

Moreover, on the side turned towards the open central zone 4 in which the touch-sensitive screen 3 is placed, the gutter may be furnished with a relief 10 making it possible to further improve the anchoring of the finger of the user (FIG. 7). Such a relief is naturally particularly advantageous when the gutter is turned through 90° relative to the plane P', that is to say when the plane of truncation P of the gutter is parallel to the general plane P' of the interface (FIG. 8).

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A frame for a touch-sensitive control interface comprising:
    a peripheral border comprising longitudinal edges and transverse edges designed to surround all or some of the touch-sensitive interface;
    an open central zone by which the interface can be activated by touch; and
    at least one hollow zone delimiting a surface for receiving a finger of a user, wherein the at least one hollow zone extends along a substantial portion of a longitudinal edge of the peripheral border, and wherein the at least one hollow zone is configured to allow the finger of the user to slide along the longitudinal edge, allowing the user to reach any zone of the interface;
    wherein the hollow zone constitutes a concave gutter which extends along at least one of the longitudinal edges of the frame;
    wherein the gutter has a shape that varies along the said edges;
    wherein the bottom of the said hollow zone is furnished with reliefs for indexing the position of the finger of the user.

2. The frame of claim 1, wherein the gutter is furnished with a luminous edging.

3. The frame of claim 1, wherein the gutter forms an angle of 45° relative to a plane of the frame.

4. The frame of claim 1, wherein the gutter is bordered, on the side of the open central zone, by a raised zone.

5. The frame of claim 1, wherein the hollow zone constitutes a gutter which extends along at least one of the lateral edges of the frame.

6. The frame of claim 5, wherein the gutter has a shape that varies along the said edges.

7. The frame of claim 6, wherein the bottom of the said hollow zone is furnished with reliefs for indexing the position of the finger of the user.

8. The frame of claim 5, wherein the gutter is furnished with a luminous edging.

9. The frame of claim 5, wherein the gutter forms an angle of 45° relative to a plane of the frame.

10. The frame of claim 5, wherein the gutter is bordered, on the side of the open central zone, by a raised zone.

11. The frame of claim 1, wherein the hollow zone is made of a material that differs from that of the rest of the frame and can be identified by touch.

12. A control interface with a touch-sensitive screen, comprising a frame on which is mounted at least one touch-sensitive screen, wherein the frame comprises:
    a peripheral border comprising longitudinal edges and transverse edges designed to surround all or some of the touch-sensitive screen;
    an open central zone by which the touch-sensitive screen can be activated by touch; and
    at least one hollow zone delimiting a surface for receiving a finger of a user, wherein the at least one hollow zone extends along a substantial portion of a longitudinal edge of the peripheral border, and wherein the at least one hollow zone is configured to allow the finger of the user to slide along the longitudinal edge, allowing the user to reach any zone of the touch-sensitive screen;
    wherein the hollow zone constitutes a concave gutter which extends along at least one of the longitudinal edges of the frame;
    wherein the gutter has a shape that varies along the said edges;
    wherein the bottom of the said hollow zone is furnished with reliefs for indexing the position of the finger of the user.

13. The control interface of claim 12, wherein the control interface is a control interface of an item of control equipment on board an aircraft.

* * * * *